US012475856B2

(12) United States Patent
Cha et al.

(10) Patent No.: US 12,475,856 B2
(45) Date of Patent: Nov. 18, 2025

(54) GATE DRIVER AND DISPLAY DEVICE INCLUDING THE SAME

(71) Applicant: Samsung Display Co., LTD., Yongin-si (KR)

(72) Inventors: Nahyeon Cha, Yongin-si (KR); Kyungho Kim, Yongin-si (KR); Sang Yong No, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 18/978,445

(22) Filed: Dec. 12, 2024

(65) Prior Publication Data

US 2025/0232731 A1 Jul. 17, 2025

(30) Foreign Application Priority Data

Jan. 17, 2024 (KR) ........................ 10-2024-0007508

(51) Int. Cl.

*G09G 3/3266* (2016.01)
*G09G 3/32* (2016.01)
*G09G 3/3233* (2016.01)

(52) U.S. Cl.

CPC ............. *G09G 3/3266* (2013.01); *G09G 3/32* (2013.01); *G09G 3/3233* (2013.01); *G09G 2300/0819* (2013.01); *G09G 2300/0852* (2013.01); *G09G 2300/0861* (2013.01); *G09G 2310/08* (2013.01); *G09G 2320/045* (2013.01)

(58) Field of Classification Search

CPC ...... G09G 3/3266; G09G 3/32; G09G 3/3233; G09G 2300/0819; G09G 2300/0852; G09G 2300/0861; G09G 2310/08; G09G 2320/045

See application file for complete search history.

(56) References Cited

U.S. PATENT DOCUMENTS 11,276,711 B2 * 3/2022 Inoue .................. G09G 3/3233
2018/0040274 A1 * 2/2018 Kurokawa ........... G09G 3/3677

FOREIGN PATENT DOCUMENTS

KR 10-2471098 11/2022

* cited by examiner

*Primary Examiner* — Kwang-Su Yang
(74) *Attorney, Agent, or Firm* — Innovation Counsel LLP

(57) ABSTRACT

A gate driver includes first to $n^{th}$ stages. A $k^{th}$ stage among the first to $n^{th}$ stages includes a first transistor including a second terminal electrically connected to a first control node, a fifth transistor including a gate electrically connected to an inverting control node, a sixth transistor including a gate electrically connected to a second control node, a fourth transistor including a gate which receives a low gate voltage, a first terminal electrically connected to a first control node, a second terminal electrically connected to a second control node, and a back gate, and a seventh transistor including a gate which receives a voltage of the inverting control node of a $k+1^{th}$ stage, a first terminal which receives a voltage of the first control node or the second control node of a $k-1^{th}$ stage, and a second terminal electrically connected to the back gate of the fourth transistor.

21 Claims, 12 Drawing Sheets

GATE DRIVER AND DISPLAY DEVICE INCLUDING THE SAME

CROSS-REFERENCE TO RELATED APPLICATION(S)

This application claims priority to and benefits of Korean Patent Application No. 10-2024-0007508 under 35 USC § 119, filed on Jan. 17, 2024 in the Korean Intellectual Property Office (KIPO), the entire contents of which are incorporated herein by reference.

BACKGROUND

1. Technical Field

Embodiments relate to a gate driver having improved reliability and a display device including the gate driver.

2. Description of the Related Art

A display device may include a display panel and a gate driver. The display panel may include pixels, and the gate driver may include stages that provide gate signals to the pixels.

Each of the stages may include transistors. To protect the transistors included in the stage, the stage may include at least one always-on transistor (AOT). A turn-on voltage having a constant voltage level may be applied to a gate of the always-on transistor, and accordingly, the always-on transistor may continuously maintain a turned-on state.

It is to be understood that this background of the technology section is, in part, intended to provide useful background for understanding the technology. However, this background of the technology section may also include ideas, concepts, or recognitions that were not part of what was known or appreciated by those skilled in the pertinent art prior to a corresponding effective filing date of the subject matter disclosed herein.

SUMMARY

Embodiments provide a gate driver having improved reliability.

Embodiments provide a display device including a gate driver having improved reliability.

A gate driver according to embodiments may include first to $n^{th}$ (n is a natural number greater than 1) stages. A $k^{th}$ (k is a natural number greater than 1 and less than n) stage among the first to $n^{th}$ stages may include a first transistor including a gate which receives a clock signal, a first terminal which receives an input signal, and a second terminal electrically connected to a first control node, a fifth transistor including a gate electrically connected to an inverting control node, a first terminal which receives a high gate voltage, and a second terminal electrically connected to an output node outputting a gate signal, a sixth transistor including a gate electrically connected to a second control node, a first terminal which receives a low gate voltage, and a second terminal electrically connected to the output node, a fourth transistor including a gate which receives the low gate voltage, a first terminal electrically connected to the first control node, a second terminal electrically connected to the second control node, and a back gate, and a seventh transistor including a gate which receives a voltage of the inverting control node of a $k+1^{th}$ stage, a first terminal which receives a voltage of the first control node or the second control node of a $k-1^{th}$ stage, and a second terminal electrically connected to the back gate of the fourth transistor.

In an embodiment, the fourth transistor may be a P-type transistor.

In an embodiment, a threshold voltage of the fourth transistor may be negatively shifted in a period in which the first control node or the second control node of the $k-1^{th}$ stage has the high gate voltage and the inverting control node of the $k+1^{th}$ stage has the low gate voltage.

In an embodiment, the seventh transistor may be a P-type transistor.

In an embodiment, the $k^{th}$ stage may further include a second transistor including a gate electrically connected to the second control node, a first terminal which receives the low gate voltage, and a second terminal electrically connected to the inverting control node.

In an embodiment, the $k^{th}$ stage may further include a third transistor including a gate electrically connected to the first control node, a first terminal which receives the high gate voltage, and a second terminal electrically connected to the inverting control node.

In an embodiment, the second transistor may be an N-type transistor, and the third transistor may be a P-type transistor.

In an embodiment, the $k^{th}$ stage may further include a first capacitor including a first terminal electrically connected to the second control node and a second terminal electrically connected to the output node, and a second capacitor including a first terminal which receives the high gate voltage and a second terminal electrically connected to the inverting control node.

A gate driver according to embodiments may include first to $n^{th}$ (n is a natural number greater than 1) stages. A $k^{th}$ (k is a natural number greater than 1 and less than n) stage among the first to $n^{th}$ stages may include a first transistor including a gate which receives a clock signal, a first terminal which receives an input signal, and a second terminal electrically connected to a first control node, a fifth transistor including a gate electrically connected to an inverting control node, a first terminal which receives a high gate voltage, and a second terminal electrically connected to an output node outputting a gate signal, a sixth transistor including a gate electrically connected to a second control node, a first terminal which receives a low gate voltage, and a second terminal electrically connected to the output node, a fourth transistor including a gate which receives the low gate voltage, a first terminal electrically connected to the first control node, a second terminal electrically connected to the second control node, and a back gate, and a seventh transistor including a gate which receives a voltage of the inverting control node of a $k-1^{th}$ stage, a first terminal which receives a voltage of the first control node or the second control node of a $k+1^{th}$ stage, and a second terminal electrically connected to the back gate of the fourth transistor.

In an embodiment, the fourth transistor may be a P-type transistor.

In an embodiment, a threshold voltage of the fourth transistor may be negatively shifted in a period in which the first control node or the second control node of the $k+1^{th}$ stage has the high gate voltage and the inverting control node of the $k-1^{th}$ stage has the low gate voltage.

In an embodiment, the seventh transistor may be a P-type transistor.

In an embodiment, the $k^{th}$ stage may further include a second transistor including a gate electrically connected to the second control node, a first terminal which receives the low gate voltage, and a second terminal electrically connected to the inverting control node.

In an embodiment, the $k^{th}$ stage may further include a third transistor including a gate electrically connected to the first control node, a first terminal which receives the high gate voltage, and a second terminal electrically connected to the inverting control node.

In an embodiment, the second transistor may be an N-type transistor, and the third transistor may be a P-type transistor.

In an embodiment, the $k^{th}$ stage may further include a first capacitor including a first terminal electrically connected to the second control node and a second terminal electrically connected to the output node, and a second capacitor including a first terminal which receives the high gate voltage and a second terminal electrically connected to the inverting control node.

A display device according to embodiments may include a display panel including pixels, a data driver which provides data signals to the pixels, and a gate driver including first to $n^{th}$ (n is a natural number greater than 1) stages which provide first to $n^{th}$ gate signals to the pixels. A $k^{th}$ (k is a natural number greater than 1 and less than n) stage among the first to $n^{th}$ stages may include a first transistor including a gate which receives a clock signal, a first terminal which receives an input signal, and a second terminal electrically connected to a first control node, a fifth transistor including a gate electrically connected to an inverting control node, a first terminal which receives a high gate voltage, and a second terminal electrically connected to an output node outputting a gate signal, a sixth transistor including a gate electrically connected to a second control node, a first terminal which receives a low gate voltage, and a second terminal electrically connected to the output node, a fourth transistor including a gate which receives the low gate voltage, a first terminal electrically connected to the first control node, a second terminal electrically connected to the second control node, and a back gate, and a seventh transistor including a gate which receives a voltage of the inverting control node of a $k+1^{th}$ stage, a first terminal which receives a voltage of the first control node or the second control node of a $k-1^{th}$ stage, and a second terminal electrically connected to the back gate of the fourth transistor.

In an embodiment, each of the pixels may include a driving transistor including a gate electrically connected to a first node, a first terminal electrically connected to a second node, and a second terminal electrically connected to a third node, a write transistor including a gate which receives a write gate signal, a first terminal which receives at least one of the data signals, and a second terminal electrically connected to the second node, a compensation transistor including a gate which receives a compensation gate signal, a first terminal electrically connected to the third node, and a second terminal electrically connected to the first node, an initialization transistor including a gate which receives an initialization gate signal, a first terminal which receives a first initialization voltage, and a second terminal electrically connected to the first node, a first emission transistor including a gate which receives an emission signal, a first terminal which receives a first power voltage, and a second terminal electrically connected to the second node, a second emission transistor including a gate which receives the emission signal, a first terminal electrically connected to the third node, and a second terminal electrically connected to a fourth node, a bypass transistor including a gate which receives a bypass gate signal, a first terminal which receives a second initialization voltage, and a second terminal electrically connected to the fourth node, a bias transistor including a gate which receives the bypass gate signal, a first terminal which receives a bias voltage, and a second terminal electrically connected to the second node, a storage capacitor including a first terminal which receives the first power voltage and a second terminal electrically connected to the first node, and a light emitting element including a first terminal electrically connected to the fourth node and a second terminal which receives a second power voltage.

In an embodiment, the $k^{th}$ gate signal may be at least one of the compensation gate signal, the initialization gate signal, the emission signal, and the bypass gate signal.

In an embodiment, the fourth transistor may be a P-type transistor.

In an embodiment, the $k^{th}$ stage further may further include a second transistor including a gate electrically connected to the second control node, a first terminal which receives the low gate voltage, and a second terminal electrically connected to the inverting control node, and a third transistor including a gate electrically connected to the first control node, a first terminal which receives the high gate voltage, and a second terminal electrically connected to the inverting control node.

In the gate driver and the display device according to the embodiments, the seventh transistor may apply a high voltage to the fourth transistor which is an always-on transistor (AOT), so that the threshold voltage of the fourth transistor may be negatively shifted, and a leakage current of the fourth transistor may be reduced. Accordingly, a low voltage of the gate signal may not increase, and the reliability of the gate driver may be improved.

BRIEF DESCRIPTION OF THE DRAWINGS

Illustrative, non-limiting embodiments will be more clearly understood from the following detailed description taken in conjunction with the accompanying drawings.

DETAILED DESCRIPTION OF THE EMBODIMENTS

Figure 1:
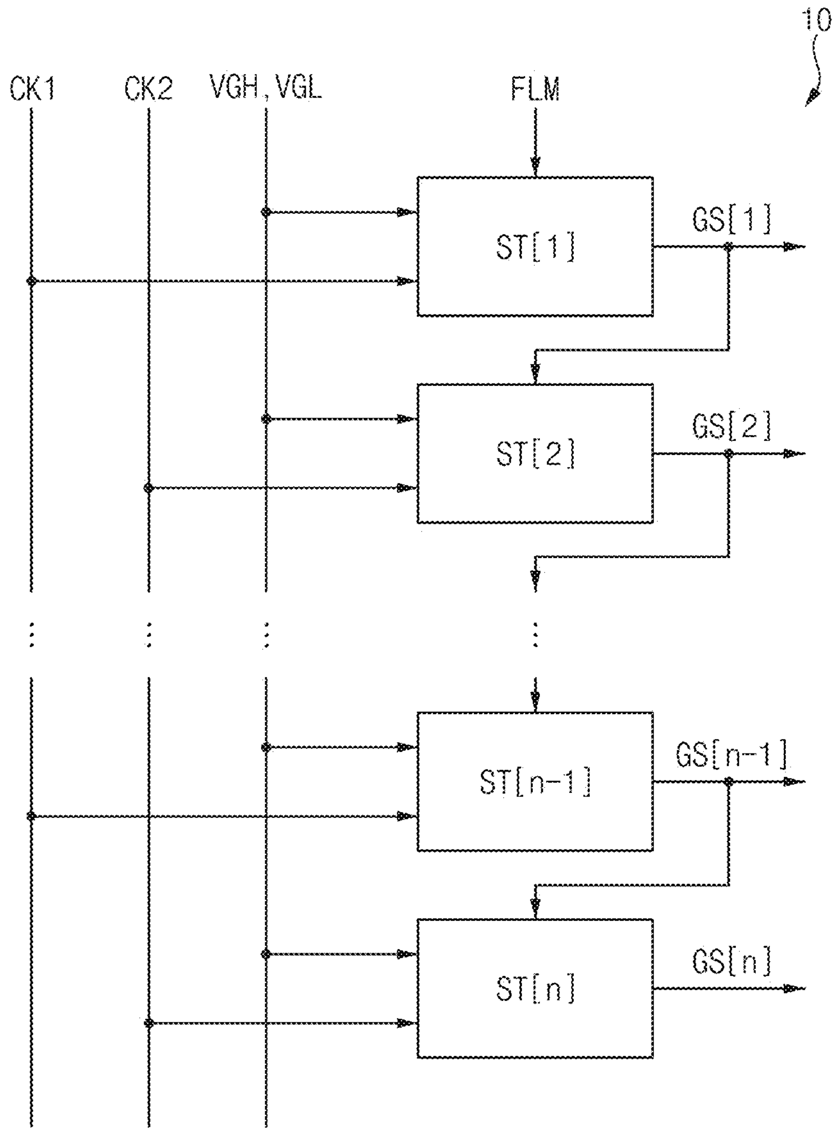
FIG. 1 is a schematic block diagram showing a gate driver according to an embodiment.

Hereinafter, a gate driver and a display device according to embodiments of the disclosure will be described in more detail with reference to the accompanying drawings. The same or similar reference numerals will be used for the same elements in the accompanying drawings.

As used herein, the singular forms, "a," "an," and "the" are intended to include the plural forms as well, unless the context clearly indicates otherwise.

In the specification and the claims, the term "and/or" is intended to include any combination of the terms "and" and "or" for the purpose of its meaning and interpretation. For example, "A and/or B" may be understood to mean "A, B, or A and B." The terms "and" and "or" may be used in the conjunctive or disjunctive sense and may be understood to be equivalent to "and/or."

In the specification and the claims, the phrase "at least one of" is intended to include the meaning of "at least one selected from the group of" for the purpose of its meaning and interpretation. For example, "at least one of A and B" may be understood to mean "A, B, or A and B."

It will be understood that, although the terms first, second, etc., may be used herein to describe various elements, these elements should not be limited by these terms. These terms are only used to distinguish one element from another element. For example, a first element may be referred to as a second element, and similarly, a second element may be referred to as a first element without departing from the scope of the disclosure.

It will be understood that the terms "connected to" or "coupled to" may include a physical or electrical connection or coupling.

Unless otherwise defined, all terms (including technical and scientific terms) used herein have the same meaning as commonly understood by one of ordinary skill in the art to which the disclosure pertains. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

FIG. 1 is a schematic block diagram showing a gate driver 10 according to an embodiment.

Referring to FIG. 1, a gate driver 10 may receive a first clock signal CK1, a second clock signal CK2, a high gate voltage VGH, a low gate voltage VGL, and a gate start signal FLM, and may output first to $n^{th}$ (n is a natural number greater than 1) gate signals GS[1], GS[2], . . . , GS[n−1], GS[n]. The second clock signal CK2 may be a signal obtained by shifting the first clock signal CK1 by a half period (e.g., 1 horizontal time) of the first clock signal CK1. The high gate voltage VGH may be a turn-off voltage of a P-type transistor (e.g., PMOS transistor) and a turn-on voltage of an N-type transistor (e.g., NMOS transistor). The low gate voltage VGL may be a turn-on voltage of the P-type transistor and a turn-off voltage of the N-type transistor.

The gate driver 10 may include first to $n^{th}$ stages ST[1], ST[2], . . . , ST[n−1], ST[n].

Each of the first to $n^{th}$ stages ST[1], ST[2], . . . , ST[n−1], ST[n] may receive the high gate voltage VGH and the low gate voltage VGL. Each of the first to $n^{th}$ stages ST[1], ST[2], . . . , ST[n−1], ST[n] may receive the first clock signal CK1 or the second clock signal CK2. In an embodiment, each of odd-numbered stages ST[1], . . . , ST[n−1] may receive the first clock signal CK1, and each of even-numbered stages ST[2], . . . , ST[n] may receive the second clock signal CK2. The first stage ST[1] may receive the gate start signal FLM, and each of the second to $n^{th}$ stages ST[2], . . . , ST[n−1], ST[n] may receive the gate signal output from a previous stage. The first to $n^{th}$ stages ST[1], ST[2], . . . , ST[n−1], ST[n] may output the first to $n^{th}$ gate signals GS[1], GS[2], . . . , GS[n−1], GS[n], respectively.

Figure 2:
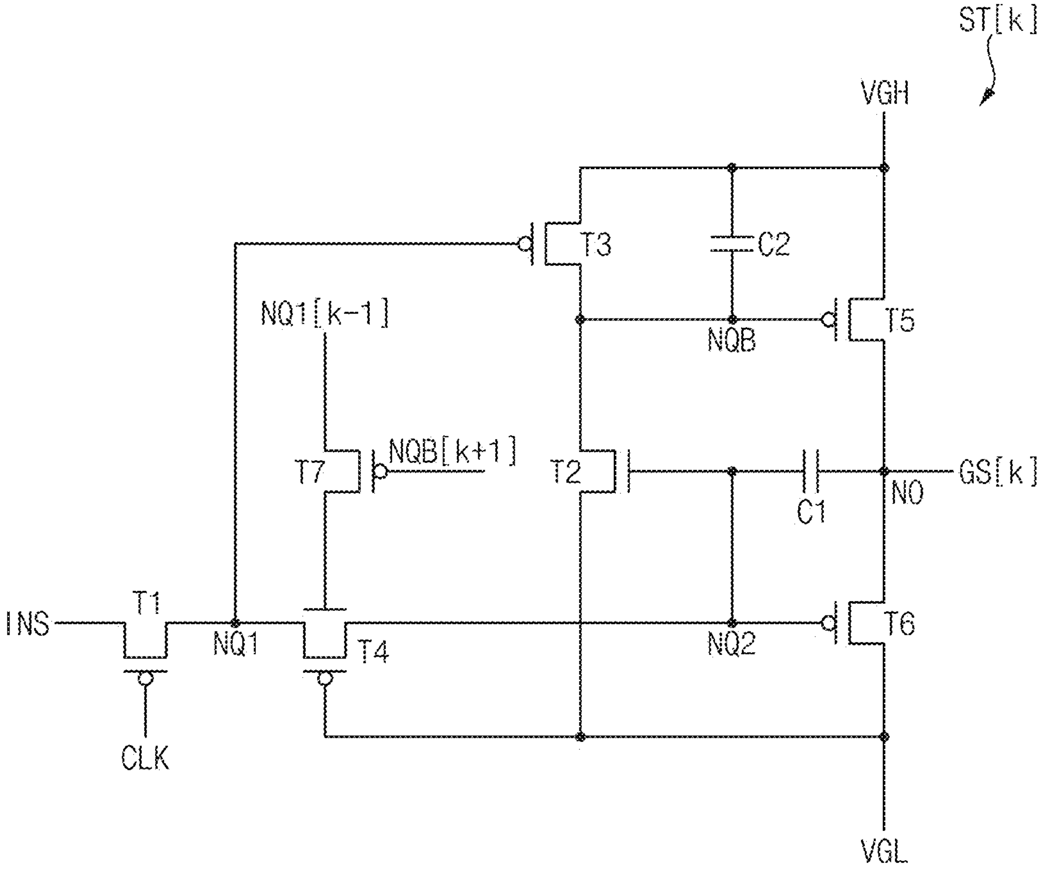
FIG. 2 is a schematic diagram of a circuit showing an example of a $k^{th}$ stage included in the gate driver of FIG. 1.

FIG. 2 is a schematic diagram of a circuit showing an example of a $k^{th}$ stage ST[k] included in the gate driver 10 of FIG. 1.

Referring to FIGS. 1 and 2, a $k^{th}$ (k is a natural number greater than or equal to 1 and less than or equal to n) stage ST[k] may receive an input signal INS, a clock signal CLK, the high gate voltage VGH, the low gate voltage VGL, a voltage of a first control node NQ1[k−1] of a $k-1^{th}$ stage ST[k−1] (hereinafter, referred to as a previous first control node), and a voltage of an inverting control node NQB[k+1] of a $k+1^{th}$ stage ST[k+1] (hereinafter referred to as a subsequent inverting control node), and may output a $k^{th}$ gate signal GS[k]. In case that the $k^{th}$ stage ST[k] is the first stage ST[1], the input signal INS may be the gate start signal FLM. In case that the $k^{th}$ stage ST[k] is one of the second to $n^{th}$ stages ST[2], . . . , ST[n−1], ST[n], the input signal INS may be a $k-1^{th}$ gate signal output from the $k-1^{th}$ stage. In case that the $k^{th}$ stage ST[k] is one of the odd-numbered stages ST[1], . . . , ST[n−1], the clock signal CLK may be the first clock signal CK1. In case that the $k^{th}$ stage ST[k] is one of the even-numbered stages ST[2], . . . , ST[n], the clock signal CLK may be the second clock signal CK2.

The $k^{th}$ stage ST[k] may include a first transistor T1, a second transistor T2, a third transistor T3, a fourth transistor T4, a fifth transistor T5, a sixth transistor T6, a seventh transistor T7, a first capacitor C1, and a second capacitor C2. However, the number of transistors included in the $k^{th}$ stage ST[k] and the number of capacitors included in the $k^{th}$ stage ST[k] are not limited thereto.

The first transistor T1 may include a gate which receives the clock signal CLK, a first terminal which receives the input signal INS, and a second terminal connected to a first control node NQ1. The first transistor T1 may transmit the input signal INS to the first control node NQ1 in response to the clock signal CLK.

The second transistor T2 may include a gate connected to a second control node NQ2, a first terminal which receives the low gate voltage VGL, and a second terminal connected to an inverting control node NQB. The second transistor T2 may transmit the low gate voltage VGL to the inverting control node NQB in response to a voltage of the second control node NQ2.

The third transistor T3 may include a gate connected to the first control node NQ1, a first terminal which receives the high gate voltage VGH, and a second terminal connected to the inverting control node NQB. The third transistor T3 may transmit the high gate voltage VGH to the inverting control node NQB in response to a voltage of the first control node NQ1.

The fourth transistor T4 may include a gate which receives the low gate voltage VGL, a first terminal connected to the first control node NQ1, a second terminal connected to the second control node NQ2, and a back gate. As the low gate voltage VGL is applied to the gate of the fourth transistor T4, the fourth transistor T4 may be an always-on transistor (AOT).

The fifth transistor T5 may include a gate connected to the inverting control node NQB, a first terminal which receives the high gate voltage VGH, and a second terminal connected to an output node NO. The gate signal GS[k] may be output from the output node NO. The fifth transistor T5 may transmit the high gate voltage VGH to the output node NO in response to a voltage of the inverting control node NQB. The fifth transistor T5 may be referred to as a first buffer transistor or a pull-up transistor.

The sixth transistor T6 may include a gate connected to the second control node NQ2, a first terminal which receives the low gate voltage VGL, and a second terminal connected to the output node NO. The sixth transistor T6 may transmit the low gate voltage VGL to the output node NO in response to the voltage of the second control node NQ2. The sixth transistor T6 may be referred to as a second buffer transistor or a pull-down transistor.

The seventh transistor T7 may include a gate which receives the voltage of the subsequent inverting control node NQB[k+1], a first terminal which receives the voltage of the previous first control node NQ1[k−1], and a second terminal connected to the back gate of the fourth transistor T4. The seventh transistor T7 may transmit the voltage of the previous first control node NQ1[k−1] to the back gate of the fourth transistor T4 in response to the voltage of the subsequent inverting control node NQB[k+1].

The first capacitor C1 may include a first terminal connected to the second control node NQ2 and a second terminal connected to the output node NO. The first capacitor C1 may store a voltage difference between the second control node NQ2 and the output node NO.

The second capacitor C2 may include a first terminal which receives the high gate voltage VGH and a second terminal connected to the inverting control node NQB. The first capacitor C1 may store the voltage of the inverting control node NQB.

In an embodiment, each of the first transistor T1, the third transistor T3, the fourth transistor T4, the fifth transistor T5, the sixth transistor T6, and the seventh transistor T7 may be a P-type transistor, and the second transistor T2 may be an N-type transistor. However, the disclosure is not limited thereto, and in another embodiment, at least one of the first transistor T1, the third transistor T3, the fourth transistor T4, the fifth transistor T5, the sixth transistor T6, and the seventh transistor T7 may be the N-type transistor, and the second transistor T2 may be the P-type transistor.

Figure 3:
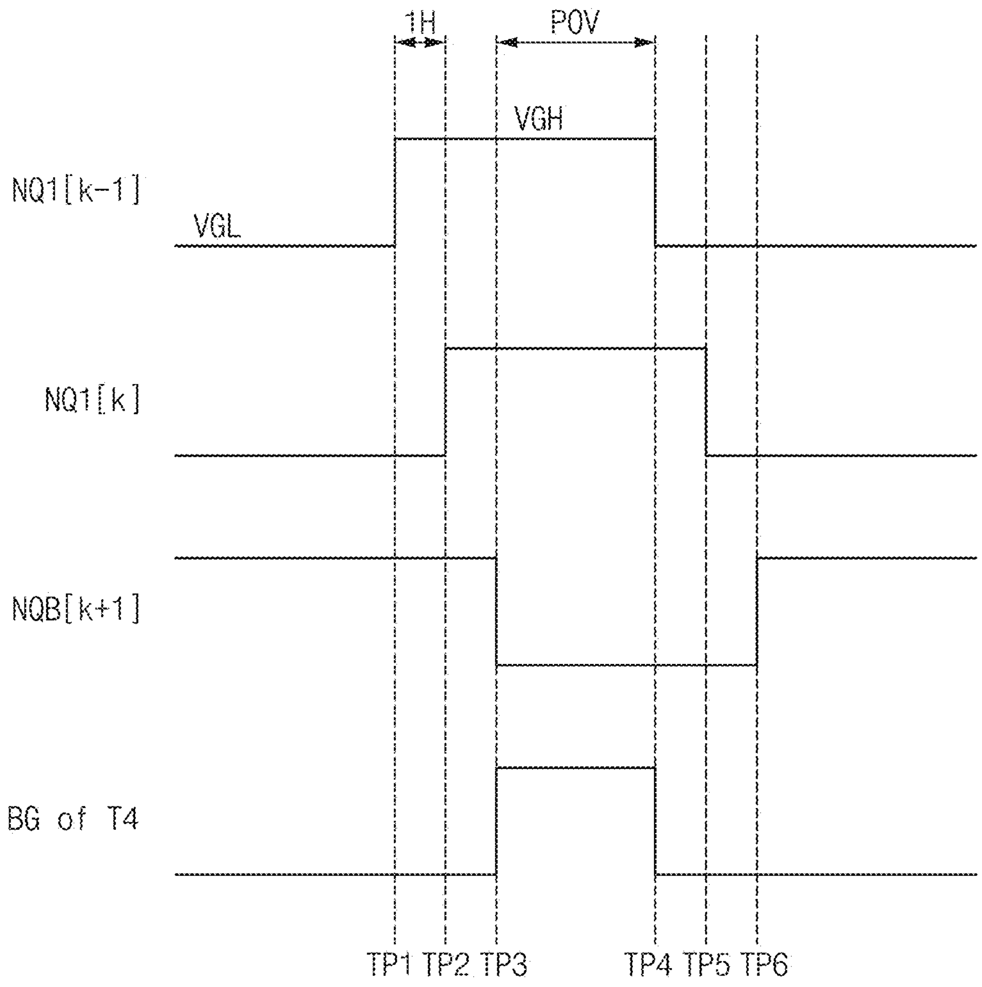
FIG. 3 is a schematic timing diagram for describing an operation of a seventh transistor included in the $k^{th}$ stage of FIG. 2.

FIG. 3 is a schematic timing diagram for describing an operation of the seventh transistor T7 included in the $k^{th}$ stage ST[k] of FIG. 2.

Referring to FIGS. 2 and 3, the voltage of the previous first control node NQ1[k−1] may transition from the low gate voltage VGL to the high gate voltage VGH at a first time point TP1, and may transition from the high gate voltage VGH to the low gate voltage VGL at a fourth time point TP4. The previous first control node NQ1[k−1] may have the high gate voltage VGH from the first time point TP1 to the fourth time point TP4.

The voltage of the first control node NQ1[k] may transition from the low gate voltage VGL to the high gate voltage VGH at a second time point TP2, and may transition from the high gate voltage VGH to the low gate voltage VGL at a fifth time point TP5. The first control node NQ1[k] may have the high gate voltage VGH from the second time point TP2 to the fifth time point TP5.

Each of a width between the first time point TP1 and the second time point TP2 and a width between the fourth time point TP4 and the fifth time point TP5 may be 1 horizontal time duration (1H). Accordingly, the voltage of the first control node NQ1[k] may be obtained by shifting the voltage of the previous first control node NQ1[k−1] by 1 horizontal time duration (1H).

The voltage of the subsequent inverting control node NQB[k+1] may transition from the high gate voltage VGH to the low gate voltage VGL at a third time point TP3, and may transition from the low gate voltage VGL to the high gate voltage VGH at a sixth time point TP6. The subsequent inverting control node NQB[k+1] may have the low gate voltage VGL from the third time point TP3 to the sixth time point TP6.

Each of a width between the second time point TP2 and the third time point TP3 and a width between the fifth time point TP5 and the sixth time point TP6 may be 1 horizontal time duration (1H). Accordingly, the voltage of the subsequent inverting control node NQB[k+1] may be a voltage obtained by inverting the voltage of the first control node NQ1[k] and shifting the inverted voltage of the first control node NQ1[k] by 1 horizontal time duration (1H).

The seventh transistor T7 may transmit the voltage of the previous first control node NQ1[k−1] to the back gate BG of the fourth transistor T4 in response to the low gate voltage VGL of the subsequent inverting control node NQB[k+1]. The seventh transistor T7 may transmit the high gate voltage VGH to the back gate BG of the fourth transistor T4 in a period POV (hereinafter referred to as an overlapping period) in which the previous first control node NQ1[k−1] has the high gate voltage VGH and the subsequent inverting control node NQB[k+1] has the low gate voltage VGL. Accordingly, a threshold voltage of the fourth transistor T4 may be negatively shifted in the overlapping period POV.

Figure 4:
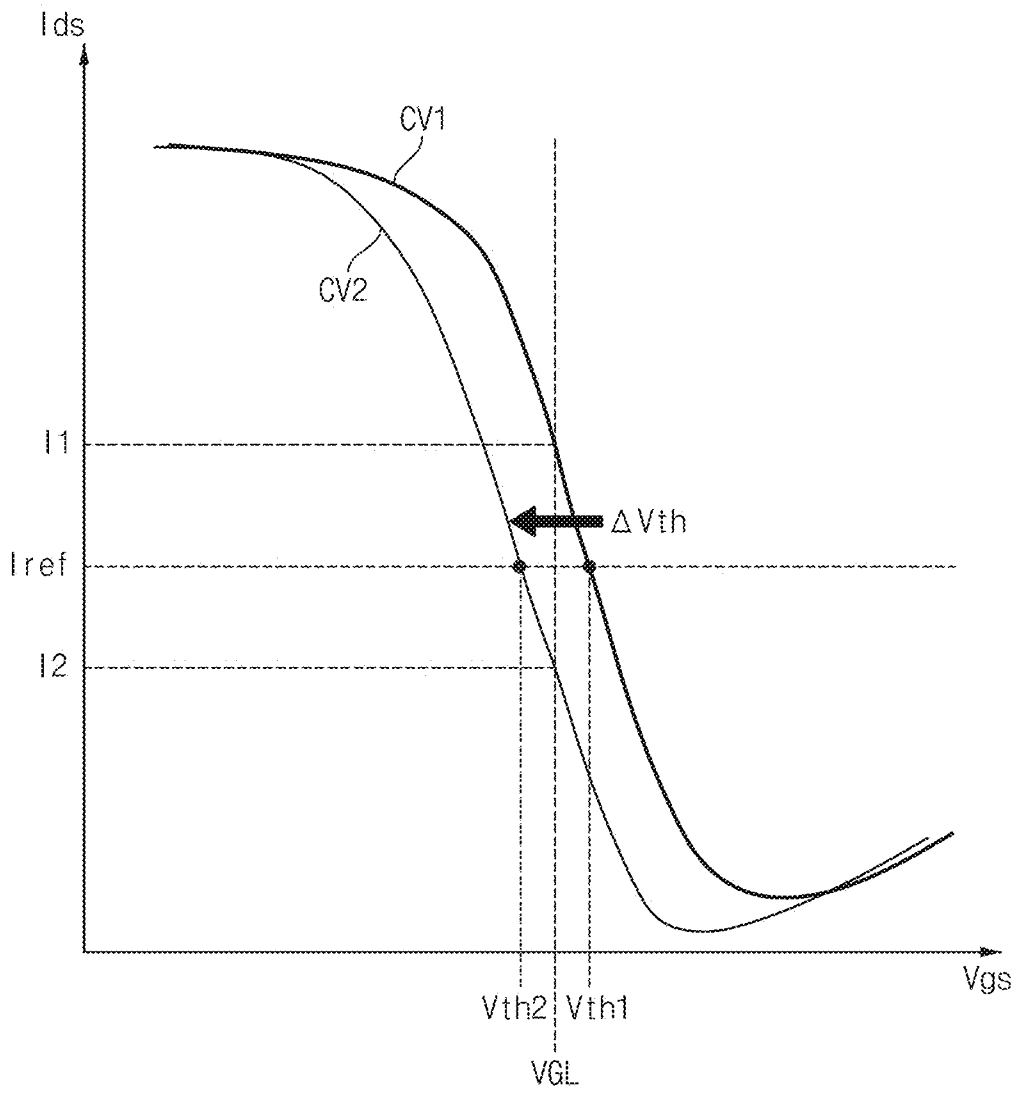
FIG. 4 is a schematic view for describing a shift of a threshold voltage of a fourth transistor included in the $k^{th}$ stage of FIG. 2.

FIG. 4 is a schematic view for describing a shift of the threshold voltage ΔVth of the fourth transistor T4 included in the $k^{th}$ stage ST[k] of FIG. 2.

Referring to FIGS. 2 to 4, as the high gate voltage VGH is applied to the back gate BG of the fourth transistor T4 in the overlapping period POV, the threshold voltage of the fourth transistor T4 may be negatively shifted (ΔVth).

In FIG. 4, a first curve CV1 represents a relationship between a voltage Vgs (hereinafter, referred to as a gate-source voltage) between the gate and the first terminal of the fourth transistor T4 and a current Ids (hereinafter, referred to as a drain-source current) flowing between the second terminal and the first terminal of the fourth transistor T4 before the high gate voltage VGH is applied to the back gate BG of the fourth transistor T4, and a second curve CV2 represents a relationship between the gate-source voltage Vgs and the drain-source current Ids after the high gate voltage VGH is applied to the back gate BG of the fourth transistor T4. Before the high gate voltage VGH is applied to the back gate BG of the fourth transistor T4, the fourth transistor T4 may have a voltage-current characteristic similar to the first curve CV1, and the fourth transistor T4 may have a first threshold voltage Vth1. After the high gate voltage VGH is applied to the back gate BG of the fourth transistor T4, the fourth transistor T4 may have a voltage-current characteristic similar to the second curve CV2, and the fourth transistor T4 may have a second threshold voltage Vth2. Accordingly, as the high gate voltage VGH is applied to the back gate BG of the fourth transistor T4 in the overlapping period POV, the threshold voltage of the fourth transistor T4 may be negatively shifted (ΔVth) from the first threshold voltage Vth1 to the second threshold voltage Vth2.

In case that the fourth transistor T4 has the voltage-current characteristic similar to the first curve CV1, the threshold voltage Vth1 of the fourth transistor T4 may be higher than the low gate voltage VGL, and a current I1 flowing through the transistor T4 may be higher than a reference current Iref flowing through the fourth transistor T4 in case that the threshold voltage Vth1 is applied to the gate of the fourth transistor T4. Accordingly, in case that the high gate voltage VGH is not applied to the back gate BG of the fourth transistor T4, a leakage current may flow through the fourth transistor T4, or the magnitude of the leakage current flowing through the fourth transistor T4 may be large.

In case that the fourth transistor T4 has the voltage-current characteristic similar to the second curve CV2, the threshold voltage Vth2 of the fourth transistor T4 may be lower than the low gate voltage VGL, and a current I2 flowing through the transistor T4 may be lower than the reference current Iref. Accordingly, in case that the high gate voltage VGH is applied to the back gate BG of the fourth transistor T4, the leakage current may not flow through the fourth transistor T4 or the magnitude of the leakage current flowing through the fourth transistor T4 may be small.

Figure 5:
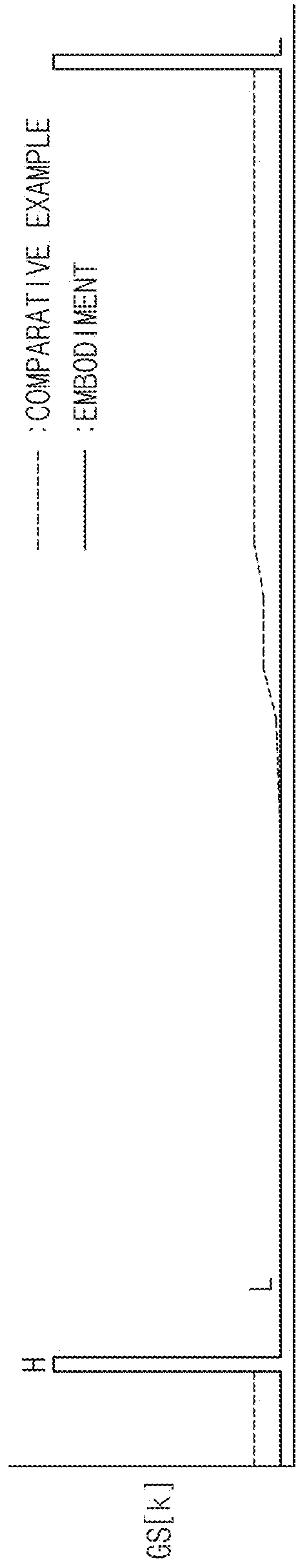
FIG. 5 is a schematic timing diagram for describing a gate signal according to a comparative example and an embodiment.

FIG. 5 is a schematic timing diagram for describing the gate signal GS[k] according to a comparative example and an embodiment.

Referring to FIGS. 2 to 5, in the comparative example, the fourth transistor T4 may be a 3-terminal element that does not include a back gate, and the fourth transistor T4 may have the voltage-current characteristic similar to the first curve CV1. Accordingly, in the comparative example, the fourth transistor T4 may have a relatively high threshold voltage Vth1, and the leakage current flowing through the fourth transistor T4 may be relatively large. In case that the leakage current flowing through the fourth transistor T4 is relatively large, a voltage of the gate of the sixth transistor T6 may increase in a period in which the gate signal GS[k] has a low voltage L (in comparison to a high voltage H), and accordingly, the low voltage L of the gate signal GS[k] may increase. In case that the low voltage L of the gate signal GS[k] increases, the margin of the gate signal GS[k] may decrease, and the reliability of the gate driver 10 may decrease.

In the embodiment, the fourth transistor T4 may be a 4-terminal element that includes a back gate, and the high gate voltage VGH is applied to the back gate of the fourth transistor T4, so that the fourth transistor T4 may have the voltage-current characteristic similar to the second curve CV2. Accordingly, in the embodiment, the fourth transistor T4 may have a relatively low threshold voltage Vth2, and the leakage current flowing through the fourth transistor T4 may be relatively small. In case that the leakage current flowing through the fourth transistor T4 is relatively small, the voltage of the gate of the sixth transistor T6 may not increase in a period in which the gate signal GS[k] has the low voltage L, and accordingly, the low voltage L of the gate signal GS[k] of the sixth transistor T6 may not increase. In case that the low voltage L of the gate signal GS[k] does not increase, the margin of the gate signal GS[k] may not decrease, and the reliability of the gate driver 10 may be degraded.

Figure 6:
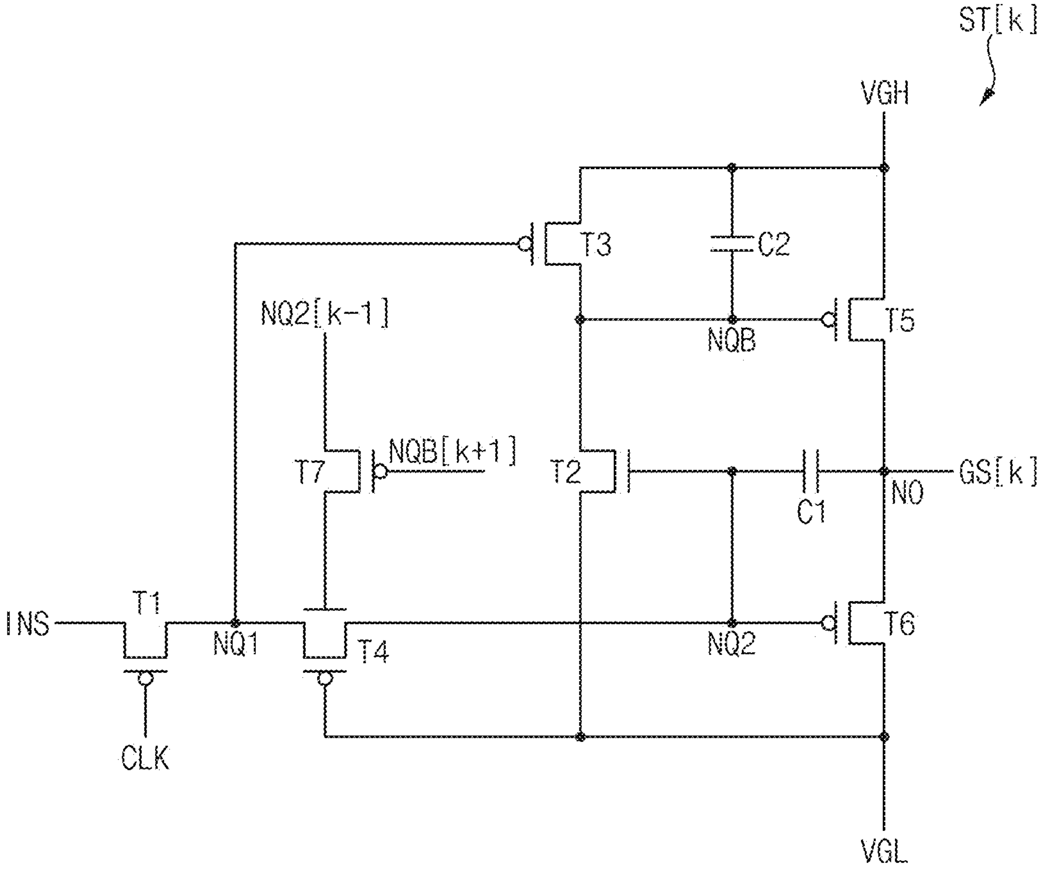
FIG. 6 is a schematic diagram of a circuit showing an example of a $k^{th}$ stage included in the gate driver of FIG. 1.

FIG. 6 is a schematic diagram of a circuit showing an example of a $k^{th}$ stage ST[k] included in the gate driver 10 of FIG. 1.

Descriptions of components of the $k^{th}$ stage ST[k] described with reference to FIG. 6, which are substantially the same as or similar to those of the $k^{th}$ stage ST[k] described with reference to FIG. 2, will be omitted.

Referring to FIG. 6, the $k^{th}$ stage ST[k] may receive the input signal INS, the clock signal CLK, the high gate voltage VGH, the low gate voltage VGL, a voltage of the second control node NQ2 [k−1] of the $k-1^{th}$ stage ST[k−1] (hereinafter referred to as a previous second control node), and the voltage of the subsequent inverting control node NQB [k+1], and may output the $k^{th}$ gate signal GS[k].

The seventh transistor T7 may include a gate which receives the voltage of the subsequent inverting control node NQB[k+1], a first terminal which receives the voltage of the previous second control node NQ2 [k−1], and a second terminal connected to the back gate of the transistor T4. The seventh transistor T7 may transmit the voltage of the previous second control node NQ2 [k−1] to the back gate of the fourth transistor T4 in response to the voltage of the subsequent inverting control node NQB[k+1].

Figure 7:
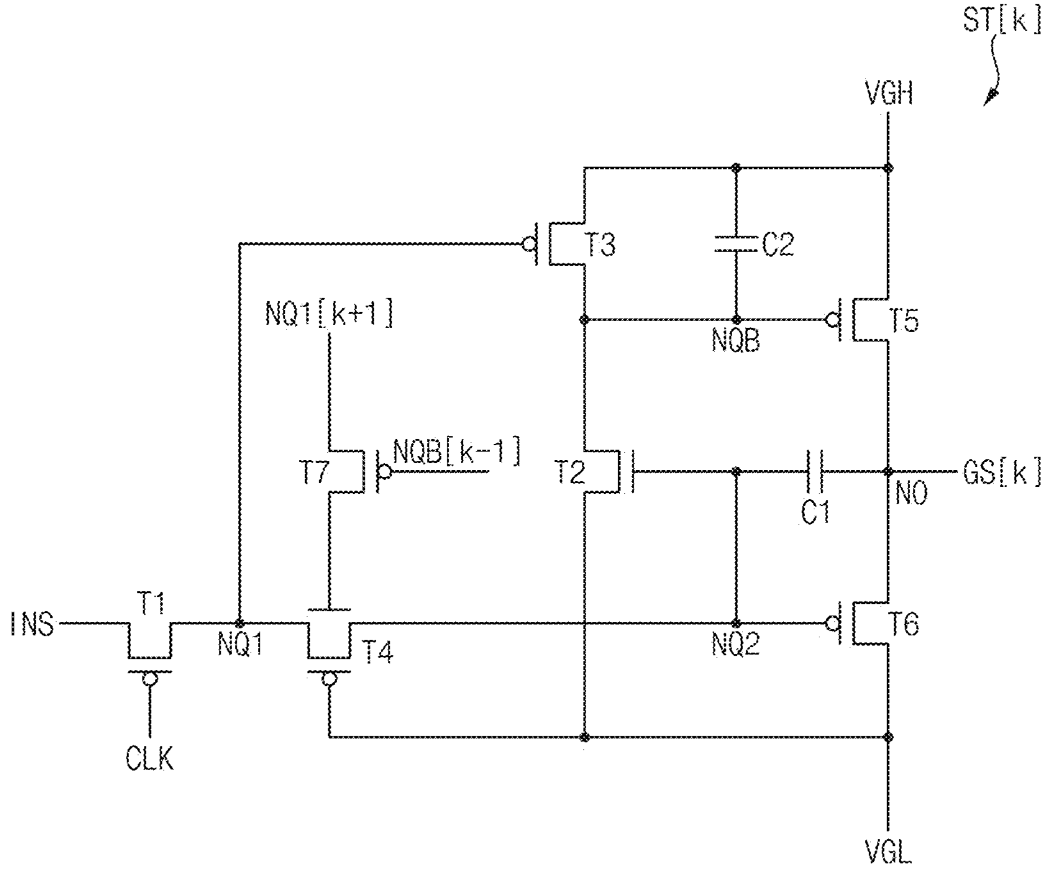
FIG. 7 is a schematic diagram of a circuit showing an example of a $k^{th}$ stage included in the gate driver of FIG. 1.

FIG. 7 is a schematic diagram of a circuit showing an example of a $k^{th}$ stage ST[k] included in the gate driver 10 of FIG. 1.

Descriptions of components of the $k^{th}$ stage ST[k] described with reference to FIG. 7, which are substantially the same as or similar to those of the $k^{th}$ stage ST[k] described with reference to FIG. 2, will be omitted.

Referring to FIG. 7, the $k^{th}$ stage ST[k] may receive the input signal INS, the clock signal CLK, the high gate voltage VGH, the low gate voltage VGL, a voltage of the first control node NQ1[k+1] of the $k+1^{th}$ stage ST[k+1] (hereinafter referred to as a subsequent first control node), and a voltage of the inverting control node NQB[k−1] of the $k-1^{th}$ stage ST[k−1] (hereinafter referred to as a previous inverting control node), and may output the $k^{th}$ gate signal GS[k].

The seventh transistor T7 may include a gate which receives the voltage of the previous inverting control node NQB[k−1], a first terminal which receives the voltage of the subsequent first control node NQ1[k+1], and a second terminal connected to the back gate of the transistor T4. The seventh transistor T7 may transmit the voltage of the subsequent first control node NQ1[k+1] to the back gate of the fourth transistor T4 in response to the voltage of the previous inverting control node NQB[k−1].

Figure 8:
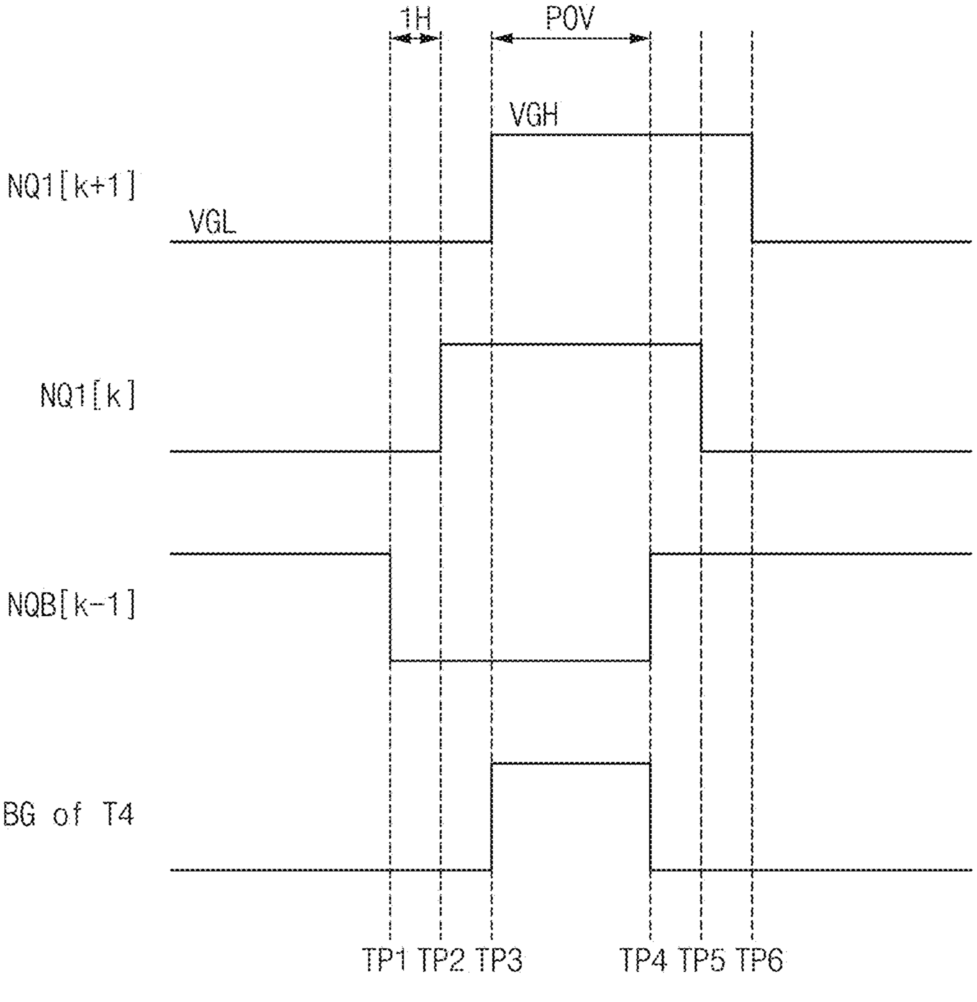
FIG. 8 is a schematic timing diagram for describing an operation of a seventh transistor included in the $k^{th}$ stage of FIG. 7.

FIG. 8 is a schematic timing diagram for describing an operation of the seventh transistor T7 included in the $k^{th}$ stage ST[k] of FIG. 7.

Descriptions of operations of the seventh transistor T7 described with reference to FIG. 8, which are substantially the same as or similar to those of the seventh transistor T7 described with reference to FIG. 3, will be omitted.

Referring to FIGS. 7 and 8, the voltage of the subsequent first control node NQ1[k+1] may transition from the low gate voltage VGL to the high gate voltage VGH at the third time point TP3, and may transition from the high gate voltage VGH to the low gate voltage VGL at the sixth time point TP6. The subsequent first control node NQ1[k+1] may have the high gate voltage VGH from the third time point TP3 to the sixth time point TP6.

The voltage of the previous inverting control node NQB [k−1] may transition from the high gate voltage VGH to the low gate voltage VGL at the first time point TP1, and may transition from the low gate voltage VGL to the high gate voltage VGH at the fourth time point TP4. The previous inverting control node NQB[k−1] may have the low gate voltage VGL from the first time point TP1 to the fourth time point TP4.

The seventh transistor T7 may transmit the voltage of the subsequent first control node NQ1[k+1] to the back gate BG of the fourth transistor T4 in response to the low gate voltage VGL of the previous inverting control node NQB[k−1]. The seventh transistor T7 may transmit the high gate voltage VGH to the back gate BG of the fourth transistor T4 in the overlapping period POV in which the subsequent first control node NQ1[k+1] has the high gate voltage VGH and the previous inverting control node NQB[k−1] has the low gate voltage VGL. Accordingly, a threshold voltage of the fourth transistor T4 may be negatively shifted in the overlapping period POV.

Figure 9:
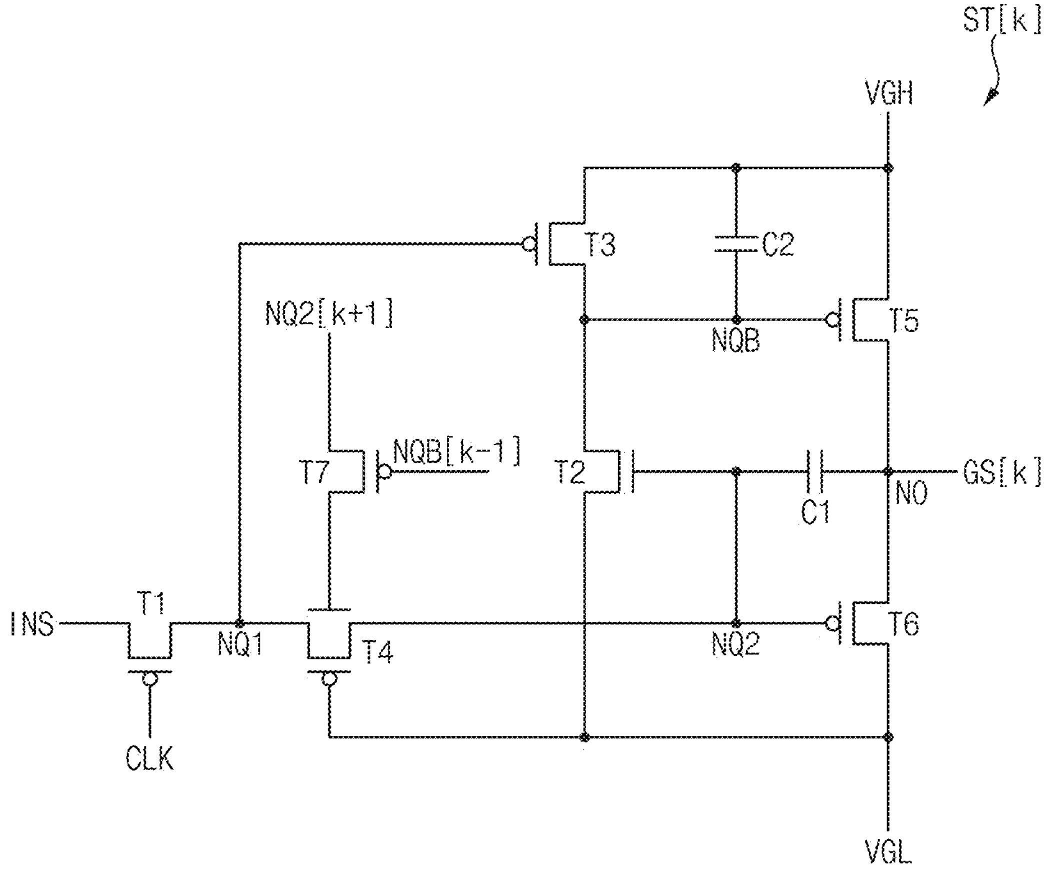
FIG. 9 is a schematic diagram of a circuit showing an example of a $k^{th}$ stage included in the gate driver of FIG. 1.

FIG. 9 is a schematic diagram of circuit diagram showing an example of a $k^{th}$ stage ST[k] included in the gate driver 10 of FIG. 1.

Descriptions of components of the $k^{th}$ stage ST[k] described with reference to FIG. 9, which are substantially the same as or similar to those of the $k^{th}$ stage ST[k] described with reference to FIGS. 2 and 7, will be omitted.

Referring to FIG. 9, the $k^{th}$ stage ST[k] may receive the input signal INS, the clock signal CLK, the high gate voltage VGH, the low gate voltage VGL, a voltage of the second control node NQ2 [k+1] of the $k+1^{th}$ stage ST[k+1] (hereinafter referred to as a subsequent second control node), and the voltage of the previous inverting control node NQB[k−1], and may output the $k^{th}$ gate signal GS[k].

The seventh transistor T7 may include a gate which receives the voltage of the previous inverting control node NQB[k−1], a first terminal which receives the voltage of the subsequent second control node NQ2 [k+1], and a second terminal connected to the back gate of the transistor T4. The seventh transistor T7 may transmit the voltage of the subsequent second control node NQ2 [k+1] to the back gate of the fourth transistor T4 in response to the voltage of the previous inverting control node NQB[k−1].

Figure 10:
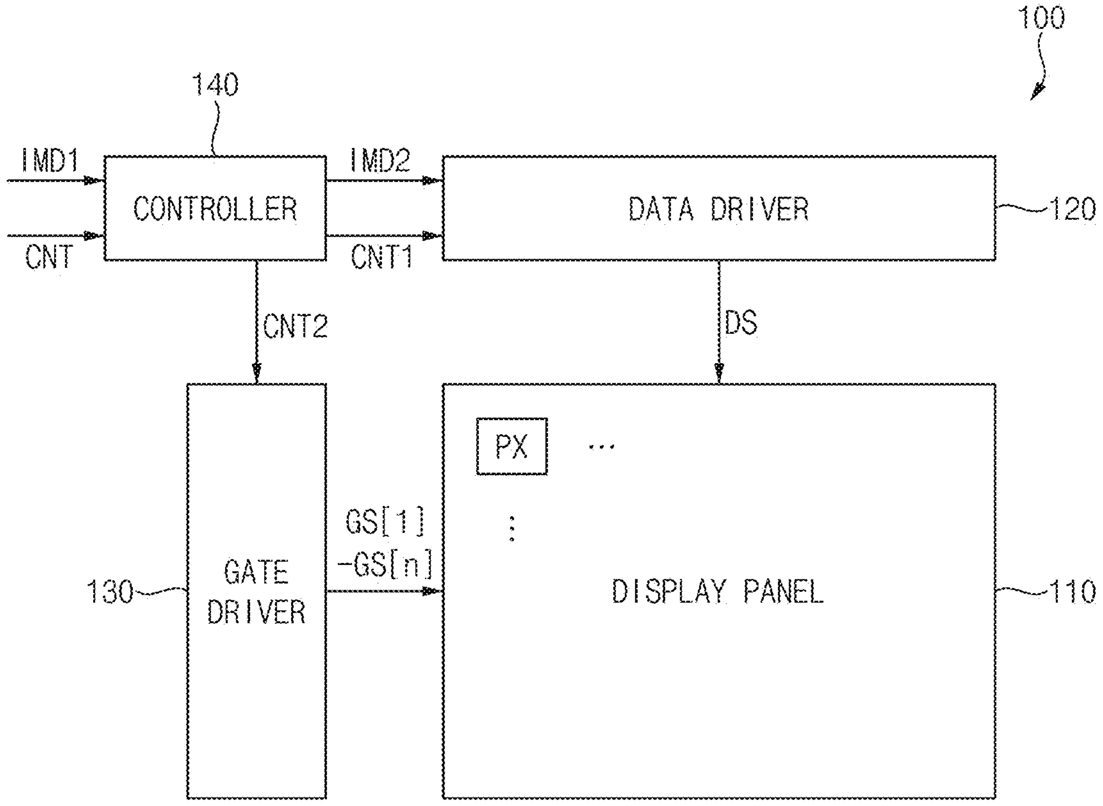
FIG. 10 is a schematic block diagram showing a display device according to an embodiment.

FIG. 10 is a schematic block diagram showing a display device 100 according to an embodiment.

Referring to FIG. 10, the display device 100 may include a display panel 110, a data driver 120, a gate driver 130, and a controller 140.

The display panel 110 may include pixels PX. The pixels PX may display an image based on gate signals GS[1]-GS [n] and data signals DS.

The data driver 120 may provide the data signals DS to the pixels PX. The data driver 120 may generate the data signals DS based on second image data IMD2 and a data control signal CNT1. The second image data IMD2 may include grayscale values corresponding to the pixels PX. The data control signal CNT1 may include an output data enable signal, a horizontal start signal, a load signal, etc.

The gate driver 130 may provide the gate signals GS[1]-GS[n] to the pixels PX. The gate driver 130 may generate the gate signals GS[1]-GS[n] based on a gate control signal CNT2. The gate control signal CNT2 may include the first clock signal (CK1 of FIG. 1), the second clock signal (CK2 of FIG. 1), and the gate start signal (FLM of FIG. 1).

FIG. 10 shows an embodiment in which the display device 100 includes one gate driver 130, but the disclosure is not limited thereto. In another embodiment, the display device 10 may include a first gate driver (or scan driver) and a second gate driver (or an emission driver).

The controller 140 may control an operation (or driving) of the data driver 120 and an operation (or driving) of the gate driver 130. The controller 140 may output the second image data IMD2 and the data control signal CNT1 to the data driver 120, and may output the gate control signal CNT2 to the gate driver 130. The controller 140 may generate the second image data IMD2, the data control signal CNT1, and the gate control signal CNT2 based on first image data IMD1 and a controller control signal CNT. The first image data IMD1 may include grayscale values corresponding to the pixels PX. The controller control signal CNT may include a master clock signal, a vertical start signal, a horizontal start signal, an input data enable signal, etc.

Figure 11:
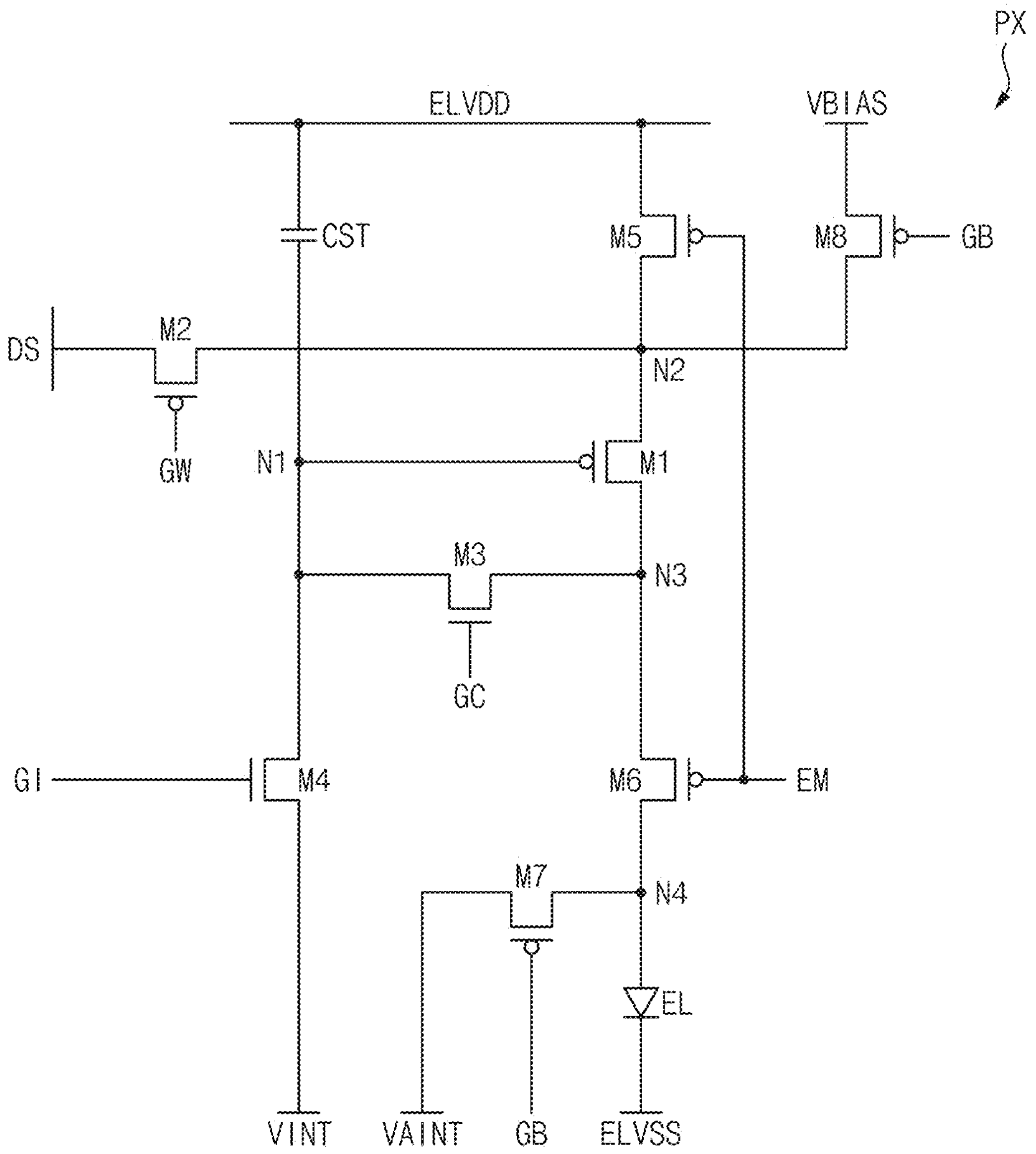
FIG. 11 is a schematic diagram of a circuit showing an example of a pixel included in the display device in FIG. 10.

FIG. 11 is a schematic diagram of a circuit showing an example of the pixel PX included in the display device 100 in FIG. 10.

Referring to FIGS. 10 and 11, the pixel PX may receive the data signal DS, a write gate signal GW, a compensation gate signal GC, an initialization gate signal GI, an emission signal EM, a bypass gate signal GB, a first initialization voltage VINT, a second initialization voltage VAINT, a first power voltage ELVDD, and a second power voltage ELVSS. In an embodiment, the gate signal may be at least one of the compensation gate signal GC, the initialization gate signal GI, the emission signal EM, and the bypass gate signal GB.

The pixel PX may include a driving transistor M1, a write transistor M2, a compensation transistor M3, an initialization transistor M4, a first emission transistor M5, a second emission transistor M6, a bypass transistor M7, a bias transistor M8, a storage capacitor CST, and a light emitting element EL.

The driving transistor M1 may include a gate connected to a first node N1, a first terminal connected to a second node N2, and a second terminal connected to a third node N3. The driving transistor M1 may generate a driving current corresponding to a voltage difference between the first node N1 and the second node N2.

The write transistor M2 may include a gate which receives the write gate signal GW, a first terminal which receives the data signal DS, and a second terminal connected to the second node N2. The write transistor M2 may transmit the data signal DS to the second node N2 in response to the write gate signal GW.

The compensation transistor M3 may include a gate which receives the compensation gate signal GC, a first terminal connected to the third node N3, and a second terminal connected to the first node N1. The compensation transistor M3 may connect the first node N1 and the third node N3 in response to the compensation gate signal GC.

The initialization transistor M4 may include a gate which receives the initialization gate signal GI, a first terminal which receives the first initialization voltage VINT, and a second terminal connected to the first node N1. The initialization transistor M4 may transmit the first initialization voltage VINT to the first node N1 in response to the initialization gate signal GI.

The first emission transistor M5 may include a gate which receives the emission signal EM, a first terminal which receives the first power voltage ELVDD, and a second terminal connected to the second node N2. The first emission transistor M5 may transmit the first power voltage ELVDD to the second node N2 in response to the emission signal EM.

The second emission transistor M6 may include a gate which receives the emission signal EM, a first terminal connected to the third node N3, and a second terminal connected to a fourth node N4. The second emission transistor M6 may connect the third node N3 and the fourth node N4 in response to the emission signal EM.

The bypass transistor M7 may include a gate which receives the bypass gate signal GB, a first terminal which receives the second initialization voltage VAINT, and a second terminal connected to the fourth node N4. The bypass transistor M7 may transmit the second initialization voltage VAINT to the fourth node N4 in response to the bypass gate signal GB.

The bias transistor M8 may include a gate which receives the bypass gate signal GB, a first terminal which receives the bias voltage VBIAS, and a second terminal connected to the second node N2. The bias transistor M8 may transmit the bias voltage VBIAS to the second node N2 in response to the bypass gate signal GB.

The storage capacitor CST may include a first terminal which receives the first power voltage ELVDD and a second terminal connected to the first node N1. The storage capacitor CST may store a voltage of the first node N1.

The light emitting element EL may include a first terminal (e.g., anode) connected to the fourth node N4 and a second terminal (e.g., cathode) which receives the second power voltage ELVSS. The light emitting element EL may emit light corresponding to the driving current generated in the driving transistor M1.

Figure 12:
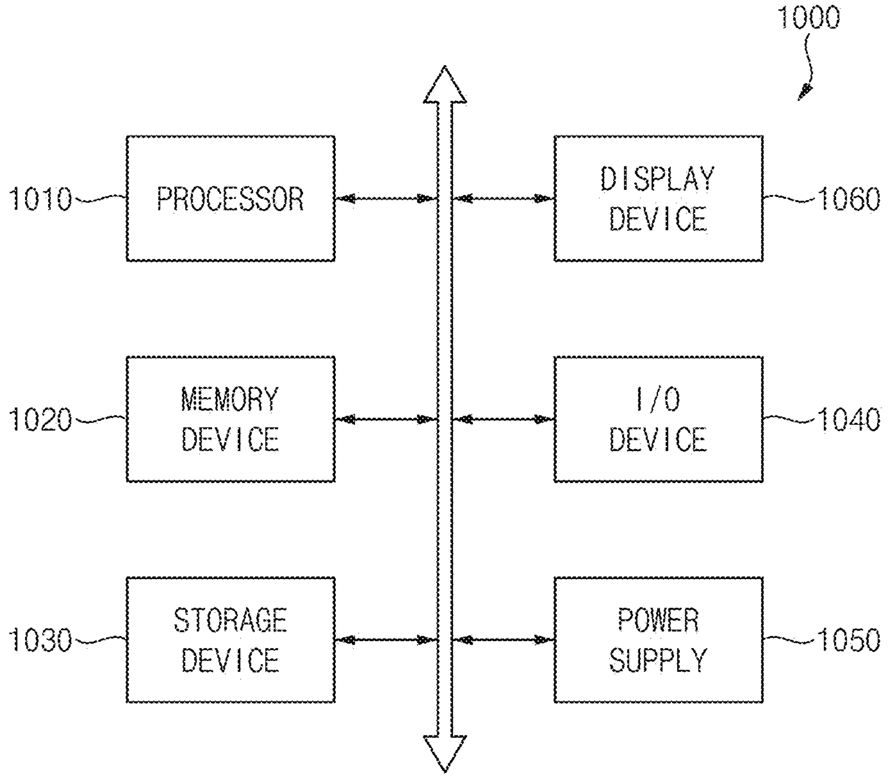
FIG. 12 is a schematic block diagram showing an electronic apparatus according to an embodiment.

FIG. 12 is a schematic block diagram showing an electronic apparatus 1000 according to an embodiment.

Referring to FIG. 12, an electronic apparatus 1000 may include a processor 1010, a memory device 1020, a storage device 1030, an input/output (I/O) device 1040, a power supply 1050, and a display device 1060. The electronic apparatus 1000 may further include ports capable of communicating with a video card, a sound card, a memory card, a USB device, and the like, or communicating with other systems.

The processor 1010 may perform specific calculations or tasks. According to an embodiment, the processor 1010 may be a microprocessor, a central processing unit (CPU), or the like. The processor 1010 may be connected to other components through an address bus, a control bus, a data bus, and the like. According to an embodiment, the processor 1010 may also be connected to an expansion bus such as a peripheral component interconnect (PCI) bus. In an embodiment, the processor 1010 may provide the first image data (IMD1 of FIG. 10) and the controller control signal (CNT of FIG. 10) to the display device 1060.

The memory device 1020 may store data for an operation of the electronic apparatus 1000. For example, the memory device 1020 may include: a nonvolatile memory device such as an erasable programmable read-only memory (EPROM), an electrically erasable programmable read-only memory (EEPROM), a flash memory, a phase change random access memory (PRAM), a resistance random access memory (RRAM), a nano floating gate memory (NFGM), a polymer random access memory (PoRAM), a magnetic random access memory (MRAM), or a ferroelectric random access memory (FRAM); and/or a volatile memory device such as a dynamic random access memory (DRAM), a static random access memory (SRAM), or a mobile DRAM.

The storage device 1030 may include a solid state drive (SSD), a hard disk drive (HDD), a CD-ROM, and the like. The I/O device 1040 may include: an input device such as a keyboard, a keypad, a touch pad, a touch screen, or a mouse; and an output device such as a speaker or a printer. The power supply 1050 may supply a power for the operation of the electronic apparatus 1000. The display device 1060 may be connected to other components through the buses or other communication links. The display device 1060 may correspond to the display device 100 of FIG. 10.

In a gate driver included in the display device 1060, a seventh transistor may apply a high voltage to a fourth transistor which is an always-on transistor (AOT), so that a threshold voltage of the fourth transistor may be negatively shifted, and a leakage current of the fourth transistor may be reduced. Accordingly, a low voltage of the gate signal may not increase, and reliability of the gate driver may be improved.

The display device according to the embodiments may be applied to a display device included in a computer, a notebook, a mobile phone, a smart phone, a smart pad, a smart watch, a PMP, a PDA, an MP3 player, or the like.

Embodiments have been disclosed herein, and although terms are employed, they are used and are to be interpreted in a generic and descriptive sense only and not for purpose of limitation. In some instances, as would be apparent by one of ordinary skill in the art, features, characteristics, and/or elements described in connection with an embodiment may be used singly or in combination with features, characteristics, and/or elements described in connection with other embodiments unless otherwise specifically indicated. Accordingly, it will be understood by those of ordinary skill in the art that various changes in form and details may be made without departing from the spirit and scope of the disclosure.

What is claimed is:

1. A gate driver, comprising:

first to $n^{th}$ (n is a natural number greater than 2) stages, a $k^{th}$ (k is a natural number greater than 1 and less than n) stage among the first to $n^{th}$ stages including:

a first transistor including a gate which receives a clock signal, a first terminal which receives an input signal, and a second terminal electrically connected to a first control node;

a fifth transistor including a gate electrically connected to an inverting control node, a first terminal which receives a high gate voltage, and a second terminal electrically connected to an output node outputting a gate signal;

a sixth transistor including a gate electrically connected to a second control node, a first terminal which receives a low gate voltage, and a second terminal electrically connected to the output node;

a fourth transistor including a gate which receives the low gate voltage, a first terminal electrically connected to the first control node, a second terminal electrically connected to the second control node, and a back gate; and a seventh transistor including a gate which receives a voltage of the inverting control node of a $k+1^{th}$ stage, a first terminal which receives a voltage of the first control node or the second control node of a $k-1^{th}$ stage, and a second terminal electrically connected to the back gate of the fourth transistor.

2. The gate driver of claim 1, wherein the fourth transistor is a P-type transistor.

3. The gate driver of claim 1, wherein a threshold voltage of the fourth transistor is negatively shifted in a period in which the first control node or the second control node of the $k-1^{th}$ stage has the high gate voltage and the inverting control node of the $k+1^{th}$ stage has the low gate voltage.

4. The gate driver of claim 1, wherein the seventh transistor is a P-type transistor.

5. The gate driver of claim 1, wherein the $k^{th}$ stage further includes a second transistor including a gate electrically connected to the second control node, a first terminal which receives the low gate voltage, and a second terminal electrically connected to the inverting control node.

6. The gate driver of claim 5, wherein the $k^{th}$ stage further includes:

a third transistor including a gate electrically connected to the first control node, a first terminal which receives the high gate voltage, and a second terminal electrically connected to the inverting control node.

7. The gate driver of claim 6, wherein:

the second transistor is an N-type transistor; and the third transistor is a P-type transistor.

8. The gate driver of claim 1, wherein the $k^{th}$ stage further includes:

a first capacitor including a first terminal electrically connected to the second control node and a second terminal electrically connected to the output node; and a second capacitor including a first terminal which receives the high gate voltage and a second terminal electrically connected to the inverting control node.

9. A gate driver, comprising:

first to $n^{th}$ (n is a natural number greater than 2) stages, a $k^{th}$ (k is a natural number greater than 1 and less than n) stage among the first to $n^{th}$ stages including:

a first transistor including a gate which receives a clock signal, a first terminal which receives an input signal, and a second terminal electrically connected to a first control node;

a fifth transistor including a gate electrically connected to an inverting control node, a first terminal which receives a high gate voltage, and a second terminal electrically connected to an output node outputting a gate signal;

a sixth transistor including a gate electrically connected to a second control node, a first terminal which receives a low gate voltage, and a second terminal electrically connected to the output node;

a fourth transistor including a gate which receives the low gate voltage, a first terminal electrically connected to the first control node, a second terminal electrically connected to the second control node, and a back gate; and a seventh transistor including a gate which receives a voltage of the inverting control node of a $k-1^{th}$ stage, a first terminal which receives a voltage of the first control node or the second control node of a $k+1^{th}$ stage, and a second terminal electrically connected to the back gate of the fourth transistor.

10. The gate driver of claim 9, wherein the fourth transistor is a P-type transistor.

11. The gate driver of claim 9, wherein a threshold voltage of the fourth transistor is negatively shifted in a period in which the first control node or the second control node of the $k+1^{th}$ stage has the high gate voltage and the inverting control node of the $k-1^{th}$ stage has the low gate voltage.

12. The gate driver of claim 9, wherein the seventh transistor is a P-type transistor.

13. The gate driver of claim 9, wherein the $k^{th}$ stage further includes:

a second transistor including a gate electrically connected to the second control node, a first terminal which receives the low gate voltage, and a second terminal electrically connected to the inverting control node.

14. The gate driver of claim 13, wherein the $k^{th}$ stage further includes:

a third transistor including a gate electrically connected to the first control node, a first terminal which receives the high gate voltage, and a second terminal electrically connected to the inverting control node.

15. The gate driver of claim 14, wherein:

the second transistor is an N-type transistor; and the third transistor is a P-type transistor.

16. The gate driver of claim 9, wherein the $k^{th}$ stage further includes:

a first capacitor including a first terminal electrically connected to the second control node and a second terminal electrically connected to the output node; and a second capacitor including a first terminal which receives the high gate voltage and a second terminal electrically connected to the inverting control node.

17. A display device, comprising:

a display panel including pixels;

a data driver which provides data signals to the pixels; and a gate driver including first to $n^{th}$ (n is a natural number greater than 2) stages which provide first to $n^{th}$ gate signals to the pixels, a $k^{th}$ (k is a natural number greater than 1 and less than n) stage among the first to $n^{th}$ stages including:

a first transistor including a gate which receives a clock signal, a first terminal which receives an input signal, and a second terminal electrically connected to a first control node;

a fifth transistor including a gate electrically connected to an inverting control node, a first terminal which receives a high gate voltage, and a second terminal electrically connected to an output node outputting a gate signal;

a sixth transistor including a gate electrically connected to a second control node, a first terminal which receives a low gate voltage, and a second terminal electrically connected to the output node;

a fourth transistor including a gate which receives the low gate voltage, a first terminal electrically connected to the first control node, a second terminal electrically connected to the second control node, and a back gate; and a seventh transistor including a gate which receives a voltage of the inverting control node of a $k+1^{th}$ stage, a first terminal which receives a voltage of the first control node or the second control node of a $k-1^{th}$ stage, and a second terminal electrically connected to the back gate of the fourth transistor.

18. The display device of claim 17, wherein each of the pixels includes:

a driving transistor including a gate electrically connected to a first node, a first terminal electrically connected to a second node, and a second terminal electrically connected to a third node;

a write transistor including a gate which receives a write gate signal, a first terminal which receives at least one of the data signals, and a second terminal electrically connected to the second node;

a compensation transistor including a gate which receives a compensation gate signal, a first terminal electrically connected to the third node, and a second terminal electrically connected to the first node;

an initialization transistor including a gate which receives an initialization gate signal, a first terminal which receives a first initialization voltage, and a second terminal electrically connected to the first node;

a first emission transistor including a gate which receives an emission signal, a first terminal which receives a first power voltage, and a second terminal electrically connected to the second node;

a second emission transistor including a gate which receives the emission signal, a first terminal electrically connected to the third node, and a second terminal electrically connected to a fourth node;

a bypass transistor including a gate which receives a bypass gate signal, a first terminal which receives a second initialization voltage, and a second terminal electrically connected to the fourth node;

a bias transistor including a gate which receives the bypass gate signal, a first terminal which receives a bias voltage, and a second terminal electrically connected to the second node;

a storage capacitor including a first terminal which receives the first power voltage and a second terminal electrically connected to the first node; and a light emitting element including a first terminal electrically connected to the fourth node and a second terminal which receives a second power voltage.

19. The display device of claim 18, wherein $k^{th}$ gate signal is one of the compensation gate signal, the initialization gate signal, the emission signal, and the bypass gate signal.

20. The display device of claim 17, wherein the fourth transistor is a P-type transistor.

21. The display device of claim 17, wherein the $k^{th}$ stage further includes:

a second transistor including a gate electrically connected to the second control node, a first terminal which receives the low gate voltage, and a second terminal electrically connected to the inverting control node; and a third transistor including a gate electrically connected to the first control node, a first terminal which receives the high gate voltage, and a second terminal electrically connected to the inverting control node.

* * * * *